United States Patent [19]

Cope

[11] Patent Number: 5,252,640
[45] Date of Patent: Oct. 12, 1993

[54] WOOD COATING COMPOSITION AND PROCESS OF USE THEREOF

[75] Inventor: Carroll W. Cope, Marion, Va.

[73] Assignee: Marley Mouldings Inc., Marion, Va.

[21] Appl. No.: 832,631

[22] Filed: Feb. 7, 1992

Related U.S. Application Data

[60] Continuation-in-part of Ser. No. 481,500, Feb. 16, 1990, abandoned, which is a division of Ser. No. 308,970, Feb. 9, 1989, Pat. No. 4,921,891, which is a continuation of Ser. No. 940,904, Dec. 10, 1986, abandoned.

[51] Int. Cl.⁵ ............................................. C08K 11/00
[52] U.S. Cl. ..................................... 524/15; 427/262; 427/267; 428/151
[58] Field of Search .................. 524/15; 427/262, 267; 428/151

[56] References Cited

U.S. PATENT DOCUMENTS 4,546,133 10/1985 Cope .
4,638,022 1/1987 Cope .
4,722,854 2/1988 Cope .

Primary Examiner—Melvyn I. Marquis
Assistant Examiner—Helen F. Lee
Attorney, Agent, or Firm—Heller, Ehrman, White & McAuliffe

[57] ABSTRACT

Compositions and a method are provided for forming a coated wood product having the appearance and texture of wood grain, which conceals joints on the wood surface and which is capable of accepting conventional wood stain.

2 Claims, No Drawings

WOOD COATING COMPOSITION AND PROCESS OF USE THEREOF

This is a continuation-in-part of U.S. Ser. No. 07/481,500, filed Feb. 16, 1990, which is a division of U.S. Ser. No. 07/308,970, filed Feb. 9, 1989, now U.S. Pat. No. 4,921,891, which is a continuation of U.S. Ser. No. 940,904, filed Dec. 10, 1986.

The present invention is directed to a method and compositions used therewith for coating wood to render it capable of receiving wood-grain printing inks and conventional wood stains, while also concealing joints and other imperfections.

In the decorative uses of wood, there are many applications in which visible joints in the wood are not desired. For example, in the use of moldings along the edges of doors, window frames, and the like, it is desirable to have each edge constructed of a single length of wood. Moreover, to have a decorative effect, the wood is often stained to a desired color, such as walnut, rosewood, and the like, then covered with a protective coating such as varnish or other conventional clear coating. The use of single lengths of wood is expensive and wasteful, since short lengths of scrap wood are not reusable. There is no practical alternative to using single lengths of wood for molding. Plastics or compounded wood pulp products are usually not desirable since they either do not have sufficient strength and durability or do not have the pleasing wood grain surface texture. A piece of plywood would also be extremely expensive since one or more surfaces of the molding would have to be veneered, making it much more expensive then a solid piece of wood.

The use of scrap pieces of wood joined together, such as by finger joints, would be desirable. There has been difficulty however, in treating joined pieces of wood to have the appearance of a single piece of wood for decorative purposes. One such method is described in commonly assigned U.S. Pat. No. 4,546,133, wherein specialized wood coating and ink compositions are disclosed. The present invention provides an improved method and coating for concealing joints in wood, while still maintaining the appearance and texture of a single piece of wood. The coating according to the present invention also is capable of accepting conventional wood stains.

It is therefore an object of the present invention to provide compositions which are useful for coating wood to conceal joints, but which retain the grainy appearance of the natural wood.

It is a further object of the present invention to provide novel coatings for wood which accept conventional wood stains.

These and other objects will be apparent from the following description and preferred embodiments.

The present method utilizes a basecoat composition for covering a wood or wood product comprising a combination of resins, pigments, solvents, and additives for suspension, dispersion, wetting, thickening, flowing and anti-marring. A printing composition is also provided comprising resins, pigments, solvents, and tinting and wetting agents.

The method according to the present invention comprises the steps of applying a novel liquid basecoat onto natural wood or a wood product, evaporating volatile solvents to form a solid coating, and applying a novel ink composition in a wood grain pattern onto the solid coating.

The starting material for forming a wood product according to the present invention may be any product having a wood surface, including strips, with or without joints, sheets, including plywood and wood grain paper, or any other product derived from wood or wood pulp, sawdust, and the like. Since a primary purpose for the use of the compositions according to the present invention is to provide a decorative surface, it is desirable, but not necessary, that the starting material have a wood grain texture, since that texture will be substantially retained after the basecoat coating is applied according to the present invention.

Generally, the wood or wood product will be coated with a liquid basecoat composition according to the present invention then dried to remove the volatile solvents. The drying is preferably performed with heat in a conventional oven, but other evaporative methods may be utilized. Then a grain ink formulation may be applied in a pattern to simulate a wood grain using a conventional roller having a wood grain pattern using the inks described herein. Apparatus for performing these functions are conventional and known in the art.

The basecoat formulation according to the present invention comprises the following components: alkyd resins, other resins, absorption pigments, other pigments, suspension agent, dispersing agent, wetting agent, thickener, anti-marring agent, flow agent, and solvents.

A particularly preferred basecoat composition useful for coating wood contains the following (percentages given by volume).

|  |  |  | Manufacturer |
|---|---|---|---|
| Alkyd resin | 5.18 | Resin | Guardsman |
| RJ-100 Soln. | 5.18 | Suspension Agent | Monsanto |
| Xylene | 26.91 | Solvent |  |
| Solvent #150 | 3.30 | Solvent | Chemtech |
| Chlorowax | 4.21 | Anti-mar agent | Chem-Central |
| Tripentaerythritol | 4.72 | Absorption pigment |  |
| Phoschek P/30 | 12.50 | Absorption pigment | Monsanto |
| Superfins Melamine | 4.36 | Vehicle resin | Melamine Chem. |
| Collidisperse | .27 | Wetting agent | Troy |
| Deodorant | .28 |  | Guardsman |
| EHEC solution | 8.96 | Thickener | Hercules |
| Pecan shell flour | 1.12 | Absorption pigment (45 Micron) |  |
| Industrial toluene | 1.41 | Solvent |  |
| Resimene #955 | 2.00 | Vehicle resin | Monsanto |
| Lactimon | .05 | Flow agent | BYK Malinkrodt |
| MPA 2000X | .12 | Suspension agent | NL |
| RHD 6X Titanium | 1.30 | White pigment | Tioxide |
| Methyl ethyl ketone | 4.94 | Solvent |  |
| Acetone | 3.57 | Solvent |  |
| Lacquer diluent | 5.40 | Dispersing solvent | Ashland |
| VAGH Vinyl | 1.47 | Resin | Union Carbide |
| Cellulose acetate | 1.07 | Solvent |  |
| Dioctyl phthalate | .71 | Solvent |  |
| 2444-XF Yellow | .11 | Pigment | Pfizer |
| Nytal 400 | .07 | Inert pigment | Vanderbilt |
| Jaysol Anhydrons | .17 | Solvent | Eastman |
| MIBK | .47 | Solvent |  |
| 1 Sec. CAB 531-1 | .16 | Vehicle resin | Eastman |
|  | 100.00 |  |  |

In the above preferred formulation, in addition to the alkyd resins, the other resins include Melamine, Resimene and CAB, all commercially available resins. Melamine and resimene are butylated urea resins and are commercially available from manufacturers such as Monsanto. Such other resins also include polyester resins, including water extended polyesters, polystyrene, vinyl resins including polyvinylacetate, polyvinylchloride, vinylchloride-vinylacetate copolymers and the like; polyamide resins, polyurea resins, and acrylic resins; phenolic resins, maleic resins, coumerone-indene resins, urea-formaldehyde; melamine-formaldehyde resins; epoxy resins, silicone resins, ionamer resins, acetal resins, polyethelyne, polypropolene, hydrocarbon resins, rubber derivatives, polycarbonate resins, phenoxy resins, fluorol plastics, styrene-butadiene resins, polyurethane resins, furane resins, polysulfone resins, pentaerythritol resins, ester gum, copalesters, and the like. Natural resins which may be used include shellac, rosin copal resins, damar resins, manila resins and the like.

Absorption pigments which may be utilized include tripentaerythritol, Phoscheck P/30, and pecan shell flour, or any combination thereof. The composition will also contain other pigments, which may be inorganic or organic. These pigments include RHD-6X Titanium, Yellow 2444-XF, Nytal 400.

The base coat composition will also contain suspension agents, dispersing agents, wetting agents, thickeners, anti-marring agents, flow agents and optionally, deodorant additives to alleviate any offensive smells caused by the base coat. Suspension agents include MPA-2000X, and RJ-100, both made by Monsanto. Preferred dispersing agents include a lacquer used as a diluent. Preferred wetting agents included Collidisperse, made by Troy Chemical. A preferred thickener includes EHEC Solution (Hercules). Any readily available anti-marring agent may be used such as Chlorowax. A flow agent such as Lactimon may be utilized.

Typical solvents include Xylene, Solvent #150 (Ashland), Toluene, methyl ethyl ketone,, acetone, cellulose acetate, dioctyl phthalate, Jaysol Anhydrons (Eastman), and MIBK (methyl isobutyl ketone). Other solvents may include turpentine, diapintine, pine oil, petroleum spirits, naptha, mineral spirits, methyl and ethyl alcohol, toluol, benzol, xylol, ethyl acetate, amyl acetate, and the like. The several portions of any vehicle used in comparing one of the decorative coatings are generally composed of the same basic materials although they may have varied amounts of thinners, solvents, fillers and the like so as to vary their viscosities and other physical properties, but there may be a combination of unrelated resins used on the same panel to provide texture and growth lines.

The pulverized pecan nut shell flour utilized in the base coat composition as an absorption pigment will be in the form of a fine powder, typically grain size of about 42 to 46 microns (preferably 45 average microns). Preferably pecan shell flour will be used.

The amount of the volatile solvents and esters which are utilized will be of the kind in an amount sufficient to dissolve and/or suspend the various components in a uniform liquid suspension material. It is desirable that the solvents comprise some polar solvents, such as acetone and cellulose acetate, and some non-polar solvents such as xylene, and slightly polar solvents such as ketones. Other higher molecular weight solvents may also be utilized such as petroleum distillates, esters, all of which are commercially available.

The particular proportions of the various components used may be generally in the proportions given above.

It will be understood however, that various modifications in proportions and components may be utilized without departing from the scope of the present invention.

In addition to the various pigments mentioned above, the base coat may contain various typical inorganic pigments useful for wood grain such as those iron pigments ranging in color from yellow through red, reddish brown, brown to black, similar to those found in natural wood. These iron pigments include yellow ocher, raw and burnt sienna, and raw and burnt umber. Other useful inorganic color pigments include chrome yellow, cadmium sulfide, zinc yellow, cobalt blue, ultramarine blue, iron oxide, chrome green, chromium oxide green, chromium hydroxide green, lamp black carbon, and white pigments such as titanium dioxide, titanium calcium, zinc oxide, zinc sulfide, antimony oxide, lithopone, etc. Organic pigments may also be utilized such as toluidine red, phthalocyanine blue and green, VanDyke brown, alizarin, madder lake, lythol red, etc.

After applying the base coat to the wood product, it is dried, for example, in a conventional oven to remove the volatile solvents, thereby forming a hardened base coat. An ink formulation may then be applied to the base coat with a roller having a wood grain pattern. The ink formulation comprises: resins, pigments, absorption pigments, tinting agents, wetting agents, and solvents.

The resins utilized in the above ink formulation include acrylic resins such as Joncryl 74, BALAB, UCAR-SCT 100. The pigments include various pigments utilized to simulate wood grain colors, as described above and include specifically yellow 895-000-1801 (Nuodex), burnt umber (I-347), red oxide 895-1003 (Harshaw), Mearlin silk white (an iridescent pigment). As an absorption pigment Phoschek P/30 may be utilized. As a tinting agent a tint paste such as Benzidine yellow (W-1041) may be utilized. A wetting agent such as glycol ether (PM) is used. Various solvents may be utilized such as DMAE (Union Carbide), water and ethylene glycol.

The pigments which are utilized in the ink formulation will depend upon the color of the wood grain desired. The pigments must, of course, impart a color to the ink formulation which is different from the color of the dried base coat in order to provide contrast. Usually, colorants which impart yellow or brown tones to the base coat will be useful. Typically, the base coat, after application of the ink formulation, will be stained with a conventional wood stain, which usually enhances the contrast between the base coat and the ink.

A typical ink formulation may comprise the following (% by volume):

|  |  |  | Manufacturer |
|---|---|---|---|
| Joncryl 74 | 52.24 | Acrylic resin | Johnson & Johnson |
| BALAB 3056A | .73 | Resin (latex) | Witco |
| Ethylene glycol | 2.32 | Solvent |  |
| DMAE | .58 | Solvent |  |
| Tap Water | 5.15 | Solvent |  |
| UCAR SCT100 | 1.20 | Resin (latex) | Union Carbide |
| Glycol Ether PM | 6.41 | Wetting agent | Ashland |
| 895-000-1801 Yellow | 6.22 | Pigment | Nuodex |
| W-1041 Benzidine Yellow | 4.90 | Tint paste | Harshaw |

| | | | Manufacturer |
|---|---|---|---|
| I-347 Bt. Umber | 16.77 | Pigment | Harshaw |
| 895-1003 Red Oxide | .79 | Pigment | Nuodex |
| Mearline Silk White | .22 | Iridescsnt pigment | Mearl |
| Phos Chek P/30 fine | 2.45 | Absorption pigment | Monsanto |
| | 100.00 | | |

After application of the graining ink formulation and air drying, the final wood product may be utilized as is, or stained with a conventional wood stain, then coated with a conventional varnish or other clear preservative.

The base coat and ink formulation may be applied to any wood surface, including paper, if desired.

Having described the specific embodiments of the invention, other modifications and variations will be apparent to those of ordinary skill in the art, which variations and modifications are intended to be within the scope of the present invention.

What is claimed is:

1. A method for forming a coated wood product characterized by a printed wood grain pattern, comprising the steps of:

(a) applying a liquid coating onto a wood product, said coating comprising

| | % volume |
   |---|---|
   | alkyd resins | 5.18 |
   | anti-mar agent | 4.21 |
   | tripentaerythritol | 4.72 |
   | absorption pigments | 12.50 |
   | wetting agent | 0.27 |
   | deodorant | 0.28 |
   | thickener | 8.96 |
   | pecan shell flour | 1.12 |
   | toluene | 1.41 |
   | butylated urea resins | 6.36 |
   | flow agent | 0.05 |
   | suspension agents | 5.30 |
   | white pigment | 1.30 |
   | methyl ethyl ketone | 4.94 |
   | acetone | 3.57 |
   | lacquer diluent | 5.40 |
   | vinyl resins | 1.47 |
   | cellulose acetate | 1.07 |
   | dioctyl phthalate | 0.71 |
   | yellow pigment | 0.11 |
   | inert pigment | 0.07 |
   | other solvents | 30.85 |
   | vehicle resins | 0.16 |
   | | 100.00; |

(b) evaporating volatile solvents to form a solid coating;

(c) applying an ink composition in a wood grain pattern onto said solid coating, said ink composition comprising

| | % volume |
   |---|---|
   | acrylic resins | 52.24 |
   | latex resins | 1.93 |
   | ethylene glycol | 2.32 |
   | DMAE | 0.58 |
   | water | 5.15 |
   | glycol ether | 6.41 |
   | yellow pigment | 6.22 |
   | tint paste | 4.90 |
   | burnt umber pigment | 16.77 |
   | red oxide pigment | 0.79 |
   | iridescent pigment | 0.22 |
   | absorption pigment | 2.45 |
   | | 100.00. |

2. A coated wood product formed according to the method of claim 1.

* * * * *

UNITED STATES PATENT AND TRADEMARK OFFICE
CERTIFICATE OF CORRECTION

PATENT NO. : 5,252,640

DATED : October 12, 1993

INVENTOR(S) : Carroll W. Cope

It is certified that error appears in the above-identified patent and that said Letters Patent is hereby corrected as shown below:

Col. 2, line 44, "Superfins" should be --Superfine--.

Col. 5, line 35, before "absorption pigments" and --other--

Signed and Sealed this

Seventeenth Day of May, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,252,640
DATED : Oct. 12, 1993
INVENTOR(S) : Carroll W. Cope

It is certified that error appears in the above-indentified patent and that said Letters Patent is hereby corrected as shown below:

Col. 5, Line 35, before "absorption pigments" add -- other --

Signed and Sealed this

Fifth Day of July, 1994

Attest:

BRUCE LEHMAN

Attesting Officer     Commissioner of Patents and Trademarks